United States Patent
Phan et al.

(10) Patent No.: US 12,504,909 B2
(45) Date of Patent: Dec. 23, 2025

(54) MEMORY POWER PERFORMANCE STATE OPTIMIZATION DURING IMAGE DISPLAY

(71) Applicants: Advanced Micro Devices, Inc., Santa Clara, CA (US); ATI Technologies ULC, Markham (CA)

(72) Inventors: Gia Tung Phan, Markham (CA); Ashish Jain, Austin, TX (US); Chintan S. Patel, Austin, TX (US); Benjamin Tsien, Santa Clara, CA (US); Jun Lei, Markham (CA); Shang Yang, Markham (CA); Oswin Hall, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/936,345

(22) Filed: Sep. 28, 2022

(65) Prior Publication Data

US 2024/0103754 A1 Mar. 28, 2024

(51) Int. Cl.
*G06F 3/06* (2006.01)

(52) U.S. Cl.
CPC .......... *G06F 3/0653* (2013.01); *G06F 3/0604* (2013.01); *G06F 3/0634* (2013.01); *G06F 3/0679* (2013.01)

(58) Field of Classification Search
CPC .... G06F 3/0653; G06F 3/0604; G06F 3/0634; G06F 3/0679
See application file for complete search history.

(56) References Cited

U.S. PATENT DOCUMENTS

| | | | |
|---|---|---|---|
| 8,760,946 B2 | 6/2014 | Dearth et al. | |
| 10,102,828 B2 * | 10/2018 | Priel | G09G 5/377 |
| 10,311,236 B2 | 6/2019 | Nadarajah et al. | |
| 11,699,408 B2 | 7/2023 | Rahman et al. | |
| 2015/0248741 A1 * | 9/2015 | Iranli | G06T 1/60 |
| | | | 345/557 |
| 2016/0267883 A1 * | 9/2016 | Bibikar | G06F 1/3218 |
| 2022/0244890 A1 * | 8/2022 | Bloemer | G06F 3/0679 |

* cited by examiner

*Primary Examiner* — Edward J Dudek, Jr.
(74) *Attorney, Agent, or Firm* — Kowert, Hood, Munyon, Rankin & Goetzel, P.C.; Rory D. Rankin (57) ABSTRACT

Systems, apparatuses, and methods for prefetching data by a display controller. From time to time, a performance-state change of a memory are performed. During such changes, a memory clock frequency is changed for a memory subsystem storing frame buffer(s) used to drive pixels to a display device. During the performance-state change, memory accesses may be temporarily blocked. In order to reduce visual artifacts that may occur while the memory accesses are blocked, a memory subsystem includes a control circuit configured to enable a caching mode which caches display data provided to the display controller. Subsequent requests for display data from the display controller are then serviced using the cached data instead of accessing memory.

17 Claims, 4 Drawing Sheets

MEMORY POWER PERFORMANCE STATE OPTIMIZATION DURING IMAGE DISPLAY

BACKGROUND

Description of the Related Art

Many types of computer systems include display devices to display images, video streams, and data. Accordingly, these systems typically include functionality for generating and/or manipulating images and video information. Typically, in digital imaging, the smallest item of information in an image is called a "picture element" and more generally referred to as a "pixel." Some systems include multiple separate displays. In these systems, multiple-display technology enables a single graphics processing unit (GPU) (or other device such as an accelerated processing unit (APU) or other type of system on chip (SOC) or any application-specific integrated circuit (ASIC) with a display controller) to simultaneously support multiple independent display outputs. In one example, a computing system may independently connect multiple high-resolution displays into a large integrated display surface to provide an expanded visual workspace. Gaming, entertainment, medical, audio and video editing, business and other applications may take advantage of the expanded visual workspace and increase multitasking opportunities.

For one or more supported displays, a video subsystem maintains a respective frame buffer that stores data, such as one or more video frames, which may be stored in dynamic random access memory (DRAM). For each supported display, a video controller reads data via a given one of one or more DRAM interfaces for access to a respective frame buffer. A memory clock is typically used to control a data rate for accessing the frame buffer within the DRAM. In some cases, in order to provide a physical connection for transmitting the pixel bitstream from the frame buffer to a display device, a computer is connected directly to the display device through an interface such as DisplayPort (DP), embedded DisplayPort (eDP), high-definition multimedia interface (HDMI), or other type of interface.

In a scenario where multiple workloads (e.g., game rendering, video processing) are accessing the memory subsystem, the memory subsystem can be set to a relatively high frequency (e.g., its maximum possible frequency) to ensure the operating frequency of the memory subsystem can process large numbers of reads and writes. In some cases, when memory accesses are reduced, the system may desire to reduce the memory clock frequency in order to reduce power consumption. Changing the memory clock frequency may require a training session to be performed on the memory interface, a configuration/mode change, or another action that requires access to the memory to be temporarily stopped. Stopping all memory accesses may be referred to as a "blackout period." Due to this blackout period when the memory interface needs to be retrained or when other types of mode changes need to be performed, it can be difficult to find a convenient time to halt all memory access without introducing visual artifacts on any of the displays. Consequently, improved systems and methods for managing memory bandwidth are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for prefetching data by a display controller in a computing system are disclosed. At various times, a performance-state change of a memory are performed. During such changes, a memory clock frequency is changed for a memory subsystem storing frame buffer(s) used to drive pixels to a display device. During the performance-state change, memory accesses may be temporarily blocked. To sustain a desired quality of service for the display, frame data (e.g., for the previous frame) is fetched from the memory into a cache in advance of the performance-state change. For example, frame data for the previous frame is buffered into a cache ahead of a performance-state change. While the performance-state change of the memory is being performed, requests for frame data are serviced by the cache instead of the memory. Depending on the length of the performance-state change operation(s), the frame data retrieved from the cache may be replayed one or more times.

Figure 1:
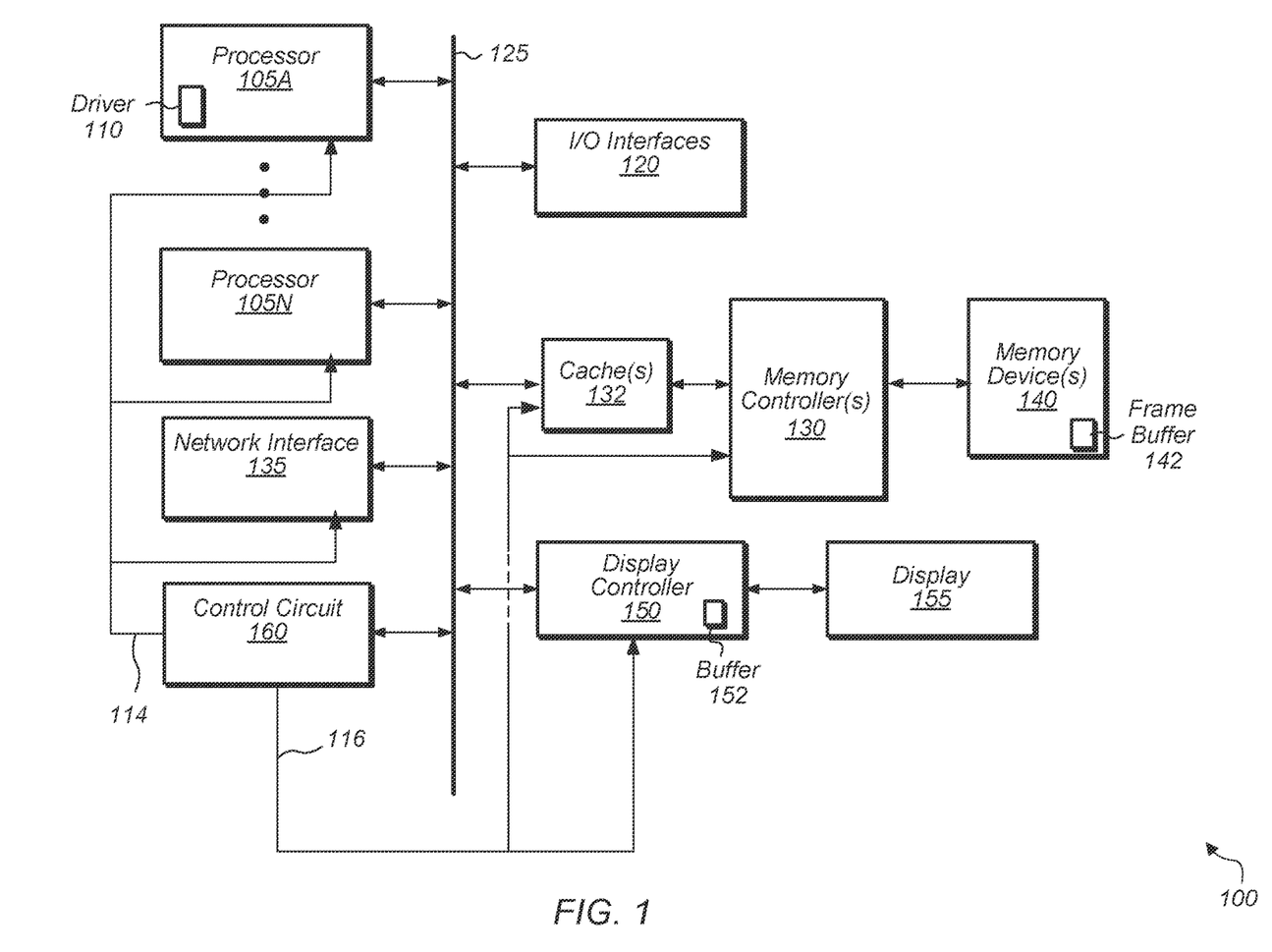
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, data fabric or bus 125, memory controller(s) 130, network interface 135, memory device(s) 140, display controller 150, display 155, and control circuit (or "control unit") 160. In other implementations, computing system 100 includes other components and/or computing system 100 is arranged differently.

Display controller 150 is representative of any number of display controllers which are included in computing system 100, with the number varying according to the implementation. Display controller 150 is configured to drive a corresponding display 155, with display 155 representative of any number of displays. In some implementations, a single display controller drives multiple displays. As shown in the example, display controller 150 includes buffer 152 for storing frame data to be displayed.

In one implementation, control circuit 160 includes circuitry configured to detect a condition(s) for performing a power and/or performance state change (also referred to as a "Pstate" change or performance state change). Such a condition may be a state of the computing system 100 corresponding to a workload, thermal condition (e.g., a temperature change or status), receipt of a signal(s) from one or more components, a requested performance increase, or otherwise. For example, in response to detecting an idle condition (e.g., a client or component(s) is relatively idle), a reduced Pstate may be assigned for the component(s). In various implementations, a change in Pstate causes a change in operating frequency and/or power consumption of a given device. For example, an increase in Pstate may entail an increase in operating frequency and voltage provided to a device. Conversely, a decrease in Pstate may entail a decrease in operating frequency and/or voltage supplied to the device.

When a condition for performing a Pstate change of the memory device(s) 140 is detected, control circuit 160 takes one or more actions to cause, or potentially cause, a Pstate change. In various implementations, memory 140 represents a system memory of computing system 100. Prior to implementing the Pstate change, the control circuit 160 is configured to convey a signal 116 (or signals) to display controller 150, memory control 130, and/or other units (e.g., signal(s) 114) in the computing system 100 to indicate the Pstate change. In response to the signal 116, the display controller 150 and/or memory controller 130 may provide an indication to the control circuit 160 regarding a current status of the respective unit. For example, such a status may indicate conditions that indicate a timing of when such a Pstate change can occur. For example, one or more transactions may be currently in progress that are to be completed prior to initiating a power state change. Additionally, the memory controller 130 includes circuitry configured to initiate a mode of operation ("mode") during which frame data provided to the display controller 150 is also cached in a cache 132. In other implementations, the display controller itself is configured to initiate such a mode. For example, the display controller would request the data from the previous frame N which has previously been cached instead of requesting frame N+1. In such a case, the requests for data corresponding to frame N would hit in the cache and not generate requests to the memory. While the following discussion generally describes such functionality residing in the memory controller 130, such functionality resides in the display controller 150. The following description is intended to cover such implementations as well. In various implementations, cache 132 is a cache (e.g., last level cache) of the computing system 100 before the memory 140. During the upcoming memory blackout period (i.e., the period during memory accesses are not permitted), the cache 132 services requests instead of the memory device(s) 140. In this manner, rather than simply being blocked from obtaining frame data from the memory device(s) 140, frame data is provided to the display controller 150 from the cache 132. In this manner, visual artifacts on the display 155 that might be produced due to data simply being blocked may be reduced.

In one implementation, the Pstate change involves adjusting the memory clock frequency of one or more memory devices 140. Control circuit 160 can be implemented using any suitable combination of circuitry, memory elements, and program instructions. It is noted that control circuit 160 can also be referred to by other names, such as a system management controller, system management circuit, system controller, controller, and so on. While a single control circuit 160 is shown in FIG. 1, it should be understood that this is merely representative of one implementation. In other implementations, computing system 100 can include multiple control circuits 160 located in any suitable locations.

Also, in another implementation, control circuit 160 is implemented by one of processor 105A-N.

Processors 105A-N are representative of any number of processors which are included in computing system 100. In one implementation, processor 105A is a general purpose processor, such as a central processing unit (CPU). In this implementation, processor 105A executes a driver 110 (e.g., graphics driver) for communicating with and/or controlling the operation of one or more of the other processors in computing system 100. It is noted that depending on the implementation, driver 110 can be implemented using any suitable combination of hardware, software, and/or firmware.

In one implementation, processor 105N is a data parallel processor with a highly parallel architecture. Data parallel processors include graphics processing circuits (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which renders pixel data into frame buffer 142 representing an image. This pixel data is then provided to display controller 150 to be driven to display 155.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), Graphics Double Data Rate (GDDR) Synchronous DRAM (SDRAM), NAND Flash memory, NOR flash memory, Ferroelectric Random Access Memory (FeRAM), or otherwise.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, more or fewer of each component than are shown in FIG. 1 are present. It is also noted that in other implementations, computing system 100 includes other components (e.g., phase-locked loops, voltage regulators) not shown in FIG. 1 to avoid cluttering the figure. Additionally, in other implementations, computing system 100 is structured in other ways than shown in FIG. 1.

Figure 2:
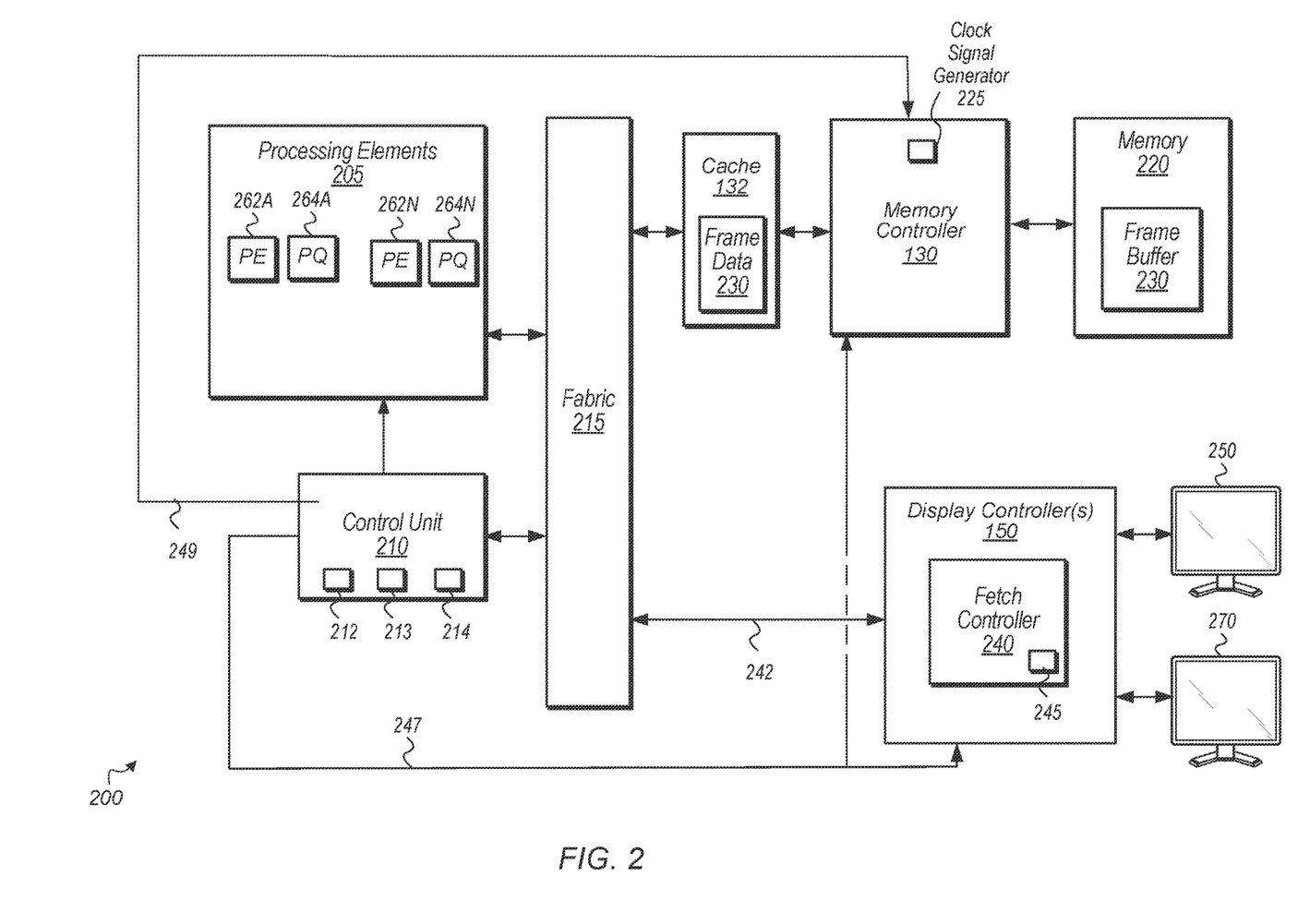
FIG. 2 is a block diagram of one implementation of a computing system.

Turning now to FIG. 2, a block diagram of one implementation of a system 200 is shown. In one implementation, system 200 includes processing elements 205, control circuit 210, fabric 215, memory subsystem 220, display controller 150, data fetch controller 240, and display device 250. While fetch controller 240 is shown as being included in display controller 150, this does not preclude fetch controller 240 from being located elsewhere. In other words, fetch controller 240 can be located internally or externally to display controller 150, depending on the implementation. Similarly, while buffer 245 is shown as being located within fetch controller 240, this does not preclude buffer 245 from being located externally to fetch controller 240 in other implementations. Generally speaking, display controller 150 receives video image and frame data from various sources, processes the data, and then sends the data out in a format that is compatible with a target display 250 (i.e., the display device to which the data it to be transmitted for display).

Processing elements 205 are representative of any number, type, and arrangement of processing resources (e.g., CPU, GPU, FPGA, ASIC). In the example, queues 264A-264N are associated with each of the processing elements 262A-262N and are configured to store pending memory accesses generated by the processing elements 262A-262N. It is noted that a wide variety of possible arrangements of processing elements 262A-262N and queues 264A-264N are possible and are contemplated. Control circuit 210 includes any suitable combination of execution circuits, circuitry, memory, and program instructions. While control circuit 210 is shown as a separate component from processing elements 205, this is representative of one particular implementation. In another implementation, the functionality of control circuit 210 is performed, at least in part, by processing elements 205. Fabric 215 is representative of any number and type of buses, communication devices/interfaces, interconnects, and other interface modules for connecting the various components of system 200 together.

In one implementation, processing elements 205 generate pixel data for display on display device 250. This pixel data is written to frame buffer 230 in memory 220 by processing elements 205, where it is then retrieved and driven to display device 250 in one implementation. The pixel data stored in frame buffer 230 represents frames of a video sequence, or still image data, in one implementation. In another implementation, the pixel data stored in frame buffer 230 represents the screen content of a laptop or desktop personal computer (PC). In a further implementation, the pixel data stored in frame buffer 230 represents the screen content of a mobile device (e.g., smartphone, tablet). In some modes, as will be discussed below, data retrieved from the frame buffer 230 will be cached in cache 132 in addition to providing the frame data to the display controller 150. Such cached frame data is shown as frame data 230 in FIG. 2. For example, while a performance-state change is being applied to the memory 220, frame data cannot be retrieved from frame buffer 230. During this period of time, requests for frame data are serviced from the cached frame data 230 instead of memory 220 in order to prevent visual artifacts in data displayed by the display device 250. In some implementations, data fetched from the cache 132 for display represents data that has been previously displayed at least one time.

Memory subsystem 220 includes any number and type of memory controllers and memory devices. In one implementation, memory subsystem 220 is capable of operating at various different clock frequencies which can be adjusted according to various operating conditions. However, when a memory clock frequency change is implemented, memory training is typically performed to modify various parameters, adjust the characteristics of the signals generated for the transfer of data, and so on. For example, the phase, the delay, and/or the voltage level of various memory interface signals are tested and adjusted during memory training. Various signal transmissions may be conducted between a memory controller and memory in order to train these memory interface signals. During this training, memory accesses are generally halted. Finding an appropriate time to perform this memory training when modifying a memory clock frequency can be challenging.

In one implementation, control circuit 210 is configured to cause performance-state changes to the memory controller 130 and/or memory 220. When the performance state of the memory 220 is changed, this causes memory training to be performed which temporarily blocks accesses to the memory 220. In one implementation, control circuit 210 includes memory bandwidth monitors 212, tracking circuit 213, and frequency adjustment circuit 214. The memory bandwidth monitors 212, tracking circuit 213, and frequency adjustment circuit 214 can be implemented using any combination of circuitry, execution circuits, and program instructions. Also, in another implementation, memory bandwidth monitor 212, tracking circuit 213, and frequency adjustment circuit 214 are individual circuits that are separate from control circuit 210 rather than being part of control circuit 210. In other implementations, control circuit 210 can include other arrangements of components that perform similar functionality as memory bandwidth monitor 212, tracking circuit 213, and frequency adjustment circuit 214.

In one implementation, memory bandwidth monitor 212 compares real-time memory bandwidth demand of memory 220 to the memory bandwidth available with the current memory clock frequency. If the memory bandwidth available with a current memory clock frequency differs from the real-time memory bandwidth demand by more than a threshold, then control circuit 210 changes the frequencies of one or more clocks of memory subsystem 220. For example, in response to an increased memory bandwidth requirement, the frequencies of one or more of the clocks may be increased.

In one implementation, control circuit 210 sends a signal 247 to one or more of display controller 150, memory controller 130, processing elements 205, and fabric 215. In various implementations, signal 247 is conveyed via a sideband interface separate from the main interface 242 used for passing pixels to fetch controller 240. In one implementation, the main interface 242 is an embedded display port (eDP) interface. In other implementations, the main interface 242 is compatible with any of various other protocols. Sending the signal 247 over a sideband interface allows the timing and scheduling of caching of display data in the cache 132 to occur in a relatively short period of time. This is in contrast to the traditional method of sending a request over the main interface 242 which can result in a lag of several frames. Also shown in FIG. 2 is a signal 249 conveyed by control circuit 210 to memory subsystem 220 configured to cause the memory subsystem to cause a change in Pstate.

In response to the signal 249, the frequency adjustment circuit 214 generates a command to program clock signal generator 225 to generate the memory clock at a different frequency. In other implementations, control circuit 210 includes other arrangements of logic and/or circuits to cause an adjustment to be made to the memory clock frequency. As used herein, the terms "logic" and "unit" refer to circuits or circuitry configured to perform the described functions. For example, in another implementation, tracking circuit 213 and frequency adjustment circuit 214 are combined together into a single circuit. Other arrangements of circuitry, processing elements, execution circuits, interface circuits, program instructions, and other components for implementing the functionality of control circuit 210 are possible and are contemplated.

System 200 can be any of various types of computing systems. For example, in one implementation, system 200 includes a laptop connected to an external display. In this implementation, display device 250 is the internal display of the laptop. In another implementation, system 200 includes a mobile device connected to an external display. In this implementation, display device 250 is the internal display of the mobile device while display device 270 is the external display. In various implementations, multiple display controllers are present in the system 200. Other scenarios employing the components of system 200 to implement the techniques described herein are possible and are contemplated.

Figure 3:
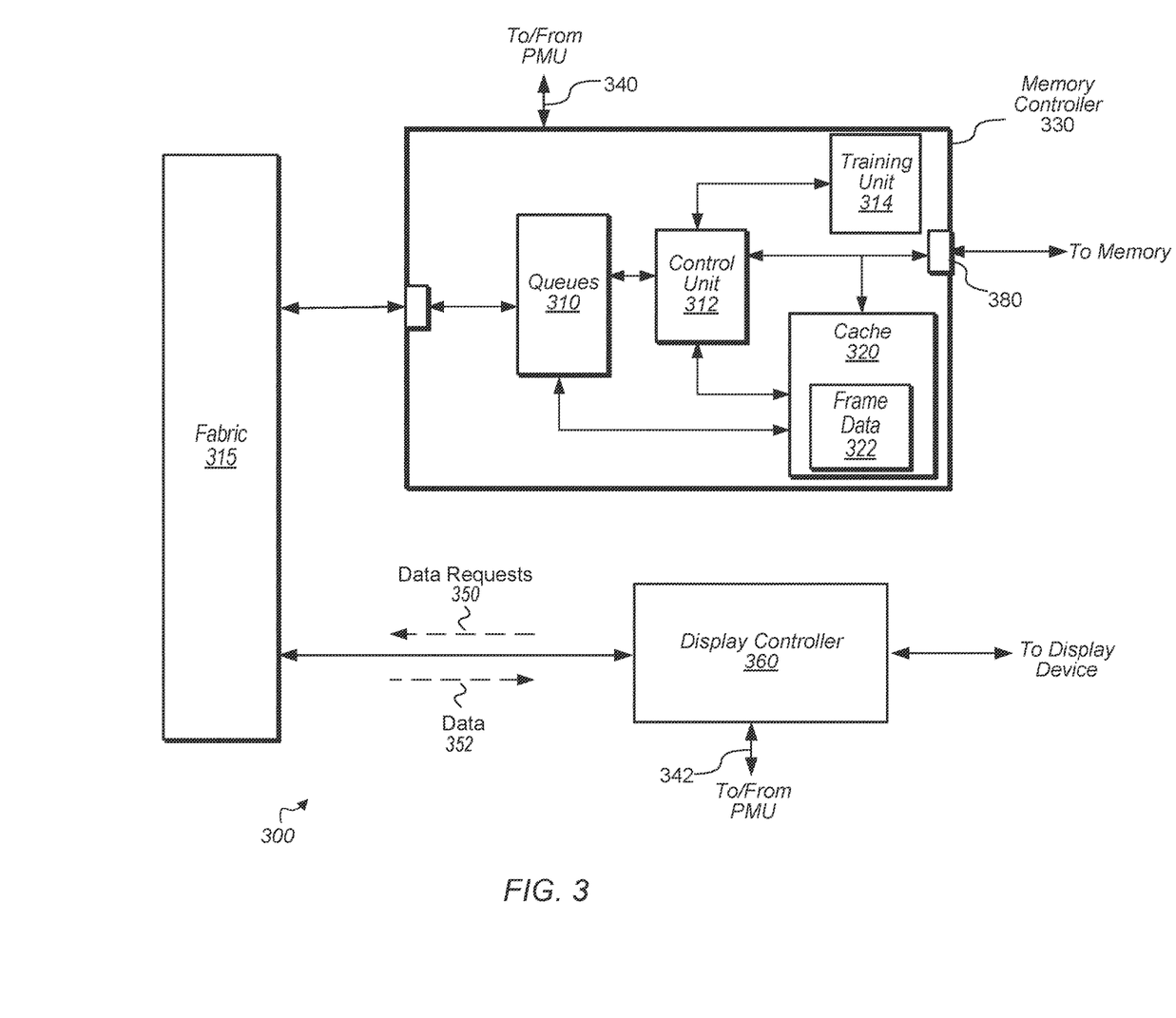
FIG. 3 is a timing diagram of one implementation of a computing system.

Referring now to FIG. 3, one implementation of a system 300 is shown. System 300 illustrates one implementation of a memory controller 330 coupled to a display controller 360 via a fabric 315. In the example shown, the memory controller is shown to be in communication with a power management unit (PMU) via interface 340 a display controller 360 is shown to be in communication with a PMU via interface 342. In various implementations, the PMU corresponds to a control circuit such as control circuit 160 of FIG. 1 or control circuit 210 of FIG. 2. Memory controller 330 is shown to include queues 310, control unit/circuit 312, cache 320, and training unit 314. Queues 310 are configured to store requests received via fabric 315 and data retrieved from memory in response to requests. Control circuit 312 is configured to service received requests and control Pstate changes of the memories coupled to the memory controller 330. In the implementation shown, the cache 320 is shown included within the memory controller 330. However, as previously described, such a cache (e.g., cache 132) may be external to the memory controller 330.

In various implementations, training unit 314 is configured to perform training of the memory interface as discussed above. In response to receiving an indication (e.g., via interface 340) of a Pstate change, control circuit 312 is configured to initiate a mode in which display data requests will be serviced from the cache 320 instead of a memory device coupled to the memory interface 380. Prior to initiating the Pstate change, control circuit 312 is configured to service requests for display data from a memory device(s) coupled to the memory interface 380. In addition to retrieving display data from a coupled memory (e.g., from a frame buffer in memory), the control unit 312 is configured to store the retrieved data in the cache 320 (shown as frame data 322) while also providing the display data to the display controller 360 via the fabric 315. In the example shown, the display controller 360 generates data requests 350 which are conveyed via the fabric 315 and receives data 352 via the fabric.

In various implementations, the control circuit 312 of the memory controller 330 is configured to cache a given amount of data retrieved from memory in the cache prior to initiating the Pstate change which would result in memory accesses being temporary blocked as discussed above (i.e., the blackout period). In various implementation, a single full frame (i.e., a complete frame) of data is cached in the cache 320 prior to the Pstate change beginning. In other implementations, different amounts of data are cached before the Pstate change is performed. In various implementations, the amount of data to be cached in the cache 320 before the Pstate change is permitted is programmable.

Prior to the above mentioned memory blackout period, data requests 350 generated by the display controller 360 are conveyed to the memory controller 330 which services the received requests by acceding memory via interface 380. Data retrieved from the memory is then provided to the display controller (e.g., data 352). In addition to providing the data to the display controller 360, memory controller 330 also causes the retrieved data to be stored in the cache 320. In various implementations, the control unit 312 tracks how much data has been retrieved from the memory and stored in the cache 320. For example, in response to detecting an indication (e.g., signal 249 in FIG. 2) that a Pstate change is to be performed, the control unit begins caching retrieved display data in the cache 320.

As noted above, the amount of display data to be cached may be determined via a programmable indication, fixed, or otherwise. In one example, a single full frame of data is to be cached in the cache 320 prior to the Pstate change being performed. In such an implementation, the control unit is configured to begin caching retrieved display data beginning with a next full frame. In other words, if the memory controller has already begun retrieval of frame data and has not yet finished, it first completes servicing of the current frame data before beginning the caching process. In various implementations, data may be fetched into the cache in response to a Pstate change independent of a frame currently being retrieved. Therefore, when a first request for data corresponding to a new frame is detected and/or otherwise retrieved for processing (e.g., a pending request in queue(s) 310), the control unit 312 begins caching the retrieved data in the cache 320 while also providing the retrieved data to the display controller 360 via the fabric 315 (or via some other data path). In response to caching a full frame of data in the cache 320, control unit 312 allows the Pstate change and corresponding training procedures to proceed.

In various implementations, the control unit 312 enters a state (or otherwise detects an indication) once the Pstate change is underway. During this period of time in which the Pstate changes and training procedures are in progress, the control unit 312 will not perform accesses to the memory via interface 380. Additionally, when servicing requests for display data (e.g., newly received requests or pending requests in queue(s) 310), the control unit 312 services the request(s) by accessing the frame data 322 stored in the cache 320 instead of accessing memory. When servicing requests for display data from the cache 320, the control unit 312 provides cached data that was previously requested by the display controller 360. Consequently, the display controller 360 receives the same data more than once and may display the same data more than once. In such an implementation, a frame of display data is replayed at least once.

It is noted that in various implementations, the display controller will return data cached in the cache 320 even if the returned data does not correspond to data identified by the processed request. In other words, in various implementations, requests generated by the display controller 360 include an identification of the data being requested. Such an identification may include one or more addresses, identifiers, or other indications that can be used to distinguish elements of data. In such an implementation, the control unit 312 may have cached a frame of data in the cache 320 to that corresponds to an identifier of N (e.g., Frame N). A next request received from the display controller 360 may identify frame data identified by an identifier N+1. Rather than retrieve the data corresponding to identifier N+1 from memory (which is current blocked), the control unit 312 retrieves the data corresponding to identifier N from cache 320. In various implementations, the control unit 312 identifies the returned data as corresponding to the requests for the data identified by N+1 even though it may not. In other implementations, an association between the returned data (N) and the serviced request (N+1) is indicated otherwise, such as implicitly via timing, a request, identifier, and so on. Various such embodiments are possible and are contemplated. In some implementations, the control unit 312 detects the request for data N+1 and returns cached data in response without removing the request for N+1 from the queue. In other words, the control unit 312 delays servicing of the request for the actual N+1 data stored in memory. In such an implementation, the request is serviced from memory after the Pstate change in completed. In this manner, no requests for data are actually skipped. In other implementations, the controller unit 312 considers the request for N+1 data serviced when it returns cached data corresponding to request N. In some implementations, as noted above, the display controller itself is aware of (or initiates) this mode such that it requests data for previously cached frame N rather than N+1. In such a case, those requests would then hit in the cache and would not result in an access to frame buffer memory. Various such embodiments are possible and are contemplated.

In some implementations, display controller 360 is unaware that requests for data are being serviced with data previously requested and displayed. In such implementations, the display controller 360 continues generating requests as would normally be the case. For example, display controller 360 generates requests for data N, N+1, N+2, and N+3. In a scenario where a single frame is replayed during a memory Pstate change, data returned to the display controller will be N, N, N+1, N+2, and N+3. In this case, frame N is replayed. In an alternative implementation where data may be skipped as noted above, the display controller 360 generates requests for data N, N+1, N+2, and N+3. In a scenario where a single frame is replayed during a memory Pstate change and data is skipped, data returned to the display controller will be N, N, N+2, and N+3. In this case, the data corresponding to request N+1 has been skipped. In various implementations, skipping data may be desired where the timing of the display of data is important (e.g., real time video conferencing, online games, etc.). In various implementations, skipping or not skipping data is programmable. In other implementations, the display controller is aware of display data allocations into the cache. For example, in such an implementation, once a frame is fully cached, the display controller switches to the cache for accessing data enables the Pstate change to proceed. Once the Pstate change completes, the display controller returns to the memory as a source of data.

Figure 4:
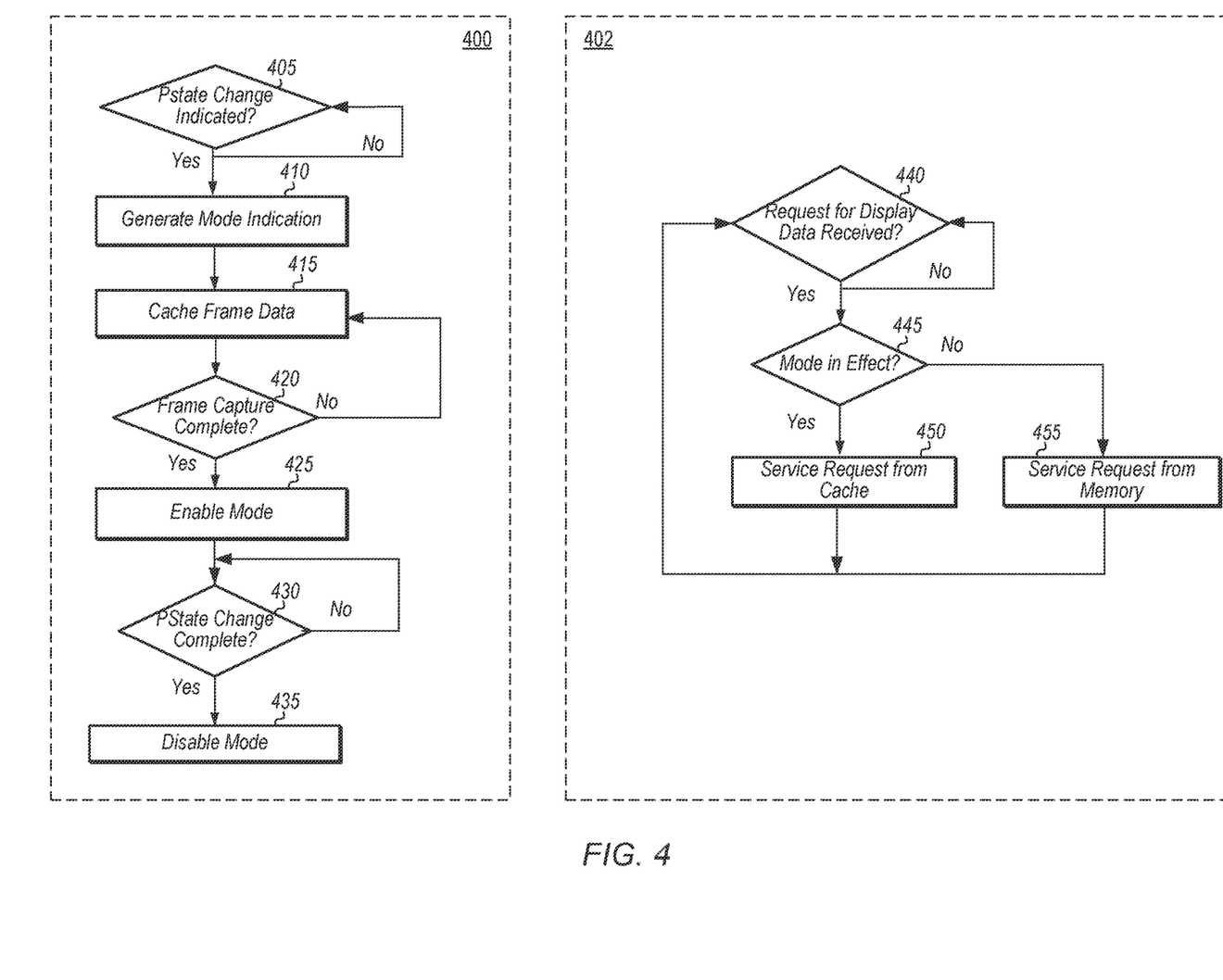
FIG. 4 is method for caching frame data during a memory training mode.

Turning now to FIG. 4, two methods are illustrated that describe operation of a system according to the above discussed implementations. A method 400 for enabling a display data caching mode is shown on the left side of FIG. 4, and a method 402 for servicing display data from a cache is shown on the right side of FIG. 4. In various implementations, each of these methods (400 and 402) operate concurrently.

In the example of method 400, a Pstate change indication (block 405) is detectable by the system. For example, as discussed above, a control unit (e.g., control circuit 160, 210) detects a condition for initiating a Pstate change of a memory subsystem and generates a corresponding indication (block 410). In response to the indication, memory controller or display controller (e.g., memory controller 130 or display controller 150) begins caching (block 415) display data fetched from the memory. For example, as discussed above, as the memory controller services requests for display data received from a display controller, the memory controller retrieves the requested data from memory and returns the requested data to the display controller. In addition to the returning the requested data to the display controller, a copy of the retrieved data is stored in a cache (e.g., cache 132). This caching of frame data retrieved from the memory continues until at least a given amount of frame data has been cached (block 420). In various implementations, the given amount of data to be cached is a full frame of data. In some implementations, the full frame of data corresponds to a single frame. In other words, the cached frame data begins on a frame boundary (i.e., the beginning of a new frame). In such an implementation, caching (block 415) of retrieved frame data begins with the start of a new frame. Therefore, if the memory controller has already begun, but not completed, fetching of a given frame from memory, it waits until the next new frame begins to start caching.

Once the given amount of frame data has been cached (block 420), a mode is enabled in which requests for display data will be serviced from the cache instead of memory (block 425). In addition, the Pstate change, and corresponding training of memory, may begin. The Pstate change continues until completed (block 430). Once the Pstate change is complete (e.g., a new stable power state and/or frequency has been established for the memory), the mode to service display data from the cache instead of memory is disabled (block 435). In various implementations, servicing of data switches from the cache to the memory on a frame boundary in order to minimize visual artifacts.

Method 402 illustrates how requests for display data are serviced in dependence on the mode enabled or disabled by method 400. As shown, circuitry in the memory subsystem (e.g., control unit 312) detects a requests for display data (block 440). Responsive to detecting such a requests, the determination is made as to whether the mode discussed in method 400 is in effect (block 445). In other words, a determination is made as to whether the mode for servicing display data requests from the cache enabled. If the mode is not in effect (block 445), then the request for display data is serviced by accessing the memory (block 455). If the mode is in effect (block 445), then the request for display data is serviced from the cache (block 450). In implementations where the display controller initiates the above described mode, the display controller causes frame data to be cached in the cache. Subsequently, when the display controller generates a request for frame data previously cached (e.g., a request for previous frame N instead of the next frame N+1), the request hits in the cache (e.g., cache 132) and is serviced from the cache. Consequently, an attempt to service the request by accessing the memory is not attempted.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a control circuit configured to:
service requests for display data from a memory, responsive to a mode of operation not being enabled;
service requests for display data from a cache, responsive to the mode of operation being enabled;
enable the mode of operation, responsive to an indication that a performance state change of the memory is to be performed; and
disable the mode of operation, responsive to completion of the performance state change.

2. The apparatus as recited in claim 1, wherein the control circuit is configured to:
store data retrieved from the memory in the cache; and
enable the mode of operation in further response to a given amount of data having been stored in the cache.

3. The apparatus as recited in claim 2, wherein the given amount of data is a full frame of data.

4. The apparatus as recited in claim 1, wherein accesses to the memory are blocked when the mode of operation is enabled.

5. The apparatus as recited in claim 1, wherein the performance state change is responsive to one or more of an idle condition of a client, an increased memory bandwidth requirement of a client, a change in temperature, a memory bandwidth demand that differs by more than a threshold from memory bandwidth available with a current memory clock frequency, or a requested performance increase.

6. The apparatus as recited in claim 4, wherein a training session is performed on the memory during the mode of operation.

7. A method comprising:
servicing, by a memory controller, requests for display data from a memory, responsive to a mode of operation not being enabled; and
servicing, by the memory controller, requests for display data from a cache, responsive to the mode of operation being enabled;
enabling, by the memory controller, the mode of operation, responsive to an indication that a performance state change of the memory is to be performed; and
disabling the mode of operation, responsive to completion of the performance state change.

8. The method as recited in claim 7, further comprising:
storing data retrieved from the memory in the cache; and
enabling the mode of operation in further response to a given amount of data having been stored in the cache.

9. The method as recited in claim 7, further comprising enabling the mode of operation responsive to a given amount of display data retrieved from the memory being stored in the cache.

10. The method as recited in claim 9, wherein the given amount of data is a full frame of data.

11. The method as recited in claim 7, wherein the performance state change is responsive to one or more of an idle condition of a client, an increased memory bandwidth requirement of a client, a change in temperature, a memory bandwidth demand that differs by more than a threshold from memory bandwidth available with a current memory clock frequency, or a requested performance increase.

12. The method as recited in claim 7, further comprising storing a copy of display data retrieved from the memory in the cache in further response to identifying a request for display data that corresponds to a new frame.

13. A system comprising:
a memory;
a cache;
a display controller; and
a control circuit configured to:
receive requests for display data from a display controller;
access the memory to service the requests for display data, responsive to a mode of operation not being enabled;
service requests for display data from the cache, responsive to the mode of operation being enabled;
enable the mode of operation, responsive to an indication that a performance state change of the memory is to be performed; and
disable the mode of operation, responsive to completion of the performance state change.

14. The system as recited in claim 13, wherein the control circuit is configured to:
store data retrieved from the memory in the cache; and
enable the mode of operation in further response to a given amount of data having been stored in the cache.

15. The system as recited in claim 13, wherein during the performance state change of the memory, access to the memory is blocked.

16. The system as recited in claim 13, wherein the control circuit is configured to service at least two requests for display data from the display controller with same data.

17. The system as recited in claim 16, wherein the display controller is configured to convey the same data to a display device at least twice.

* * * * *